United States Patent
Sugita et al.

(10) Patent No.: US 9,360,211 B2
(45) Date of Patent: Jun. 7, 2016

(54) COAL FIRED BOILER PLANT AND COAL DRYING METHOD FOR COAL FIRED BOILER PLANT

(75) Inventors: Satoru Sugita, New York, NY (US); Shintaro Honjo, New York, NY (US); Takuya Okamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/613,635

(22) Filed: Sep. 13, 2012

(65) Prior Publication Data
US 2014/0069306 A1    Mar. 13, 2014

(51) Int. Cl.
F23G 5/04 (2006.01)
F23L 15/04 (2006.01)
F23J 15/02 (2006.01)
F23J 15/04 (2006.01)
F23K 1/04 (2006.01)

(52) U.S. Cl.
CPC .............. *F23G 5/04* (2013.01); *F23J 15/022* (2013.01); *F23J 15/04* (2013.01); *F23K 1/04* (2013.01); *F23L 15/04* (2013.01); *F23J 2217/102* (2013.01); *F23K 2201/10* (2013.01); *F23K 2201/20* (2013.01)

(58) Field of Classification Search
CPC . F23K 2201/20; F22B 1/1884; B01D 53/343; F02C 7/08; F23G 7/066; F23L 15/04
USPC .................................................. 110/224, 302
See application file for complete search history.

(56) References Cited

U.S. PATENT DOCUMENTS 4,059,060 A * 11/1977 Gambs et al. ............... 110/232
4,628,869 A * 12/1986 Symsek et al. ............. 122/20 B
5,146,857 A *  9/1992 Spliethoff et al. ........... 110/234
(Continued)

FOREIGN PATENT DOCUMENTS

CN    102460016 A    5/2012
CN    102666883 A    9/2012
(Continued)

OTHER PUBLICATIONS

Written Opinion dated Nov. 5, 2013, issued in corresponding application No. PCT/JP2013/073232, w/ English translation.
(Continued)

Primary Examiner — Kenneth Rinehart
Assistant Examiner — Jason Lau
(74) Attorney, Agent, or Firm — Westerman, Hattori, Daniels & Adrian, LLP

(57) ABSTRACT

Coal is properly dried and the efficiency of a boiler is increased while suppressing any reduction in efficiency of the boiler and the generation of hydrocarbon gas components. Employed are a coal dryer that dries coal, a boiler in which the coal that is dried in the coal dryer is mixed with air for combustion and burned, an air heater that heats the air for combustion that is supplied to the boiler using combustion exhaust gas discharged from the boiler, a precipitator that collects dust included in the combustion exhaust gas, a desulfurization plant that performs a desulfurization process on the combustion exhaust gas, and heat recovery equipment that heats a heating medium using the combustion exhaust gas. The coal dryer dries the coal using the heat energy of the heating medium that has been heated in the heat recovery equipment.

12 Claims, 12 Drawing Sheets

(56) References Cited

U.S. PATENT DOCUMENTS

| | | | |
|---|---|---|---|
| 5,687,674 A * | 11/1997 | Johanntgen et al. | 122/1 A |
| 8,069,797 B2 * | 12/2011 | Srinivasachar et al. | 110/345 |
| 2008/0201980 A1 * | 8/2008 | Bullinger et al. | B03B 4/06 34/493 |
| 2010/0139276 A1 * | 6/2010 | Kravets | 60/670 |
| 2010/0288172 A1 * | 11/2010 | Jukkola et al. | 110/204 |
| 2011/0073023 A1 * | 3/2011 | Birmingham et al. | 110/345 |
| 2011/0165042 A1 * | 7/2011 | Abrams et al. | 423/210 |

FOREIGN PATENT DOCUMENTS

| | | |
|---|---|---|
| JP | 61-149627 U | 9/1986 |
| JP | H04-59024 A | 2/1992 |
| JP | 6-146812 A | 5/1994 |
| JP | 6-46092 A | 6/1994 |
| JP | 07-279621 A | 10/1995 |
| JP | 8-296835 A | 11/1996 |
| JP | 2695679 B2 | 1/1998 |
| JP | 10-281443 A | 10/1998 |
| JP | 10-332134 A | 12/1998 |
| JP | 11-062514 A | 3/1999 |
| JP | 20001-239129 A | 9/2001 |
| JP | 2006-308269 A | 11/2006 |
| JP | 2010-223572 A | 10/2010 |
| JP | WO2013-012008 A | 1/2013 |
| WO | 2010/097999 A1 | 9/2010 |
| WO | 2011/162344 A1 | 12/2011 |

OTHER PUBLICATIONS

International Search Report dated Nov. 5, 2013, issued in corresponding application No. PCT/JP2013/073232, w/ partial English translation.
Written Opinion dated May 11, 2013, issued in corresponding application No. PCT/JP2013/073232, w/ English translation.
International Search Report dated May 11, 2013, issued in corresponding application No. PCT/JP2013/073232, w/ partial English translation.
Decision of Patent Grant dated Nov. 4, 2015, issued in counterpart Japanese Patent Application No. 2014-535482, with English translation. (6 pages).
Office Action dated Jan. 29, 2016, issued in counterpart Chinese Patent Application No. 201380039970.6, with English translation. (11 pages).
Extended European Search Report dated Apr. 21, 2016, issued in counterpart European Application No. 13836881.6 (8 pages).

* cited by examiner

COAL FIRED BOILER PLANT AND COAL DRYING METHOD FOR COAL FIRED BOILER PLANT

TECHNICAL FIELD

The present invention relates to a coal fired boiler plant and a coal drying method for a coal fired boiler plant.

BACKGROUND ART

The coal that is used as fuel in electrical power generating plant equipped with a coal fired boiler turbine (hereafter simply referred to as a boiler) is classified as high-grade, medium grade, and low-grade, depending on the water content, coal rank, and the like.

Low-grade coal such as lignite and the like has high water content and low coal rank and low calorific value compared with high-grade coal, so in order to increase the combustion efficiency of the boiler, it is desirable that the coal be dried before being fed into the boiler.

Therefore, conventionally, the coal is dried by heating it using steam extracted from the boiler.

Also, it has been proposed that coal be heated and dried using combustion exhaust gas discharged from the outlet of an economizer and denitrification plant provided with the boiler (for example, see Patent Literature (PTL) 1).

CITATION LIST

Patent Literature

{PTL 1}
Japanese Unexamined Patent Application Publication No. Hei 10-332134

SUMMARY OF INVENTION

Technical Problem

However, because steam that is extracted from the boiler is used to heat the coal, naturally, efficiency of the boiler is reduced.

Also, the combustion exhaust gas discharged from the outlet of the economizer or denitrification plant is at a high temperature of from 350 to 550° C. If such a high-temperature combustion exhaust gas is used as the heating medium for drying the coal, hydrocarbon components are volatilized from the coal during the process and are mixed into the exhaust gas, and this has the problem that it has an adverse effect on the performance of the exhaust gas processing plant on the downstream side.

With the foregoing in view, it is an object of the present invention to provide a coal fired boiler plant and a coal drying method for a coal fired boiler plant that is capable of properly drying the coal and increasing the efficiency of the boiler while suppressing any reduction in efficiency of the boiler and suppressing the generation of hydrocarbon gas components.

Solution to Problem

In order to solve these problems, the following solutions are adopted as the coal fired boiler plant and the coal drying method for the coal fired boiler plant according to the present invention.

The coal fired boiler plant according to the present invention comprises: a coal dryer that dries coal; a boiler in which the coal that was dried in the coal dryer is mixed with air for combustion and burned; an air heater that heats the air for combustion supplied to the boiler using combustion exhaust gas discharged from the boiler; a precipitator that collects dust included in the combustion exhaust gas; a desulfurization plant that performs a desulfurization process on the combustion exhaust gas; and heat recovery equipment that is provided on the downstream side of the air heater in the direction of flow of the combustion exhaust gas, and that heats a heating medium with the combustion exhaust gas, wherein the coal dryer dries the coal using the heat energy of the heating medium that was heated in the heat recovery equipment.

By heating the coal using the heat energy of the heating medium that was heated in the heat recovery equipment, it is not necessary to use steam extracted from the boiler, and it is possible to suppress the reduction in efficiency of the boiler.

Also, the combustion exhaust gas from the boiler that has passed through the air heater has a lower temperature of from 130 to 170° C. compared with combustion exhaust gas discharged from an economizer or a denitrification plant (from 350 to 550° C.). Therefore, it is possible to dry the coal at a lower temperature, so it is possible to prevent the generation of hydrocarbon gas components from the coal.

In the coal fired boiler plant according to the present invention, the coal dryer can dry the coal within the coal dryer by passing the heating medium that has been heated in the heat recovery equipment through a tubes provided within the coal dryer.

Also, the coal fired boiler plant according to the present invention can dry the coal within the coal dryer by heating a carrier air supplied from the outside into the coal dryer using the heating medium that was heated in the heat recovery equipment.

The coal fired boiler plant according to the present invention may further comprise an air heater that heats carrier air supplied from the outside into the coal dryer using steam that has been extracted by extracting a portion of the steam generated by burning the coal in the boiler.

In this case, a portion of the steam is extracted from the boiler, but the steam that is extracted is used in an auxiliary manner to dry the coal that is to be heated using the heat that is recovered in the heat recovery equipment. Therefore, it is possible to minimize the quantity of steam that is extracted compared with the case where the coal is dried mainly using steam extracted from the boiler.

The coal fired boiler plant according to the present invention can further comprise a heating medium heater that further heats the heating medium that has been heated in the heat recovery equipment using steam that has been extracted by extracting a portion of the steam generated by burning the coal in the boiler.

As a result, the coal can be more efficiently dried.

In the coal fired boiler plant according to the present invention, the air heater may heat air for combustion supplied to the boiler using combustion exhaust gas discharged from the boiler, and a portion of the air for combustion may be branched off, mixed with carrier air that is supplied from the outside into the coal dryer, and supplied into the coal dryer.

As a result, the coal can be more efficiently dried. Also, by adjusting the mixing ratio of the carrier air and air for drying, the temperature can be adjusted as appropriate.

In addition, in the coal fired boiler plant according to the present invention, the desulfurization plant performs a desulfurization process by bringing the combustion exhaust gas into contact with process water, and the coal fired boiler plant can further comprise a spray dryer that evaporates wastewater obtained by separating a gypsum component from the process water after the desulfurization process, by bringing the wastewater into contact with the combustion exhaust gas on the upstream side of the desulfurization plant.

As a result, it is possible to reduce the wastewater from the desulfurization plant.

In the coal fired boiler plant according to the present invention, the exhaust air from the coal dryer can be fed to the precipitator.

As a result, the fine coal included in the exhaust air from the coal dryer can be collected by the precipitator.

The coal fired boiler plant according to the present invention can further comprise a fine coal recovery plant that recovers fine coal smaller than a predetermined particle size from the coal that is included in the exhaust air from the coal dryer, and the fine coal recovery plant can supply the recovered fine coal to the boiler together with the coal that has been dried in the coal dryer.

In addition, in the coal fired boiler plant according to the present invention, the exhaust air from which the fine coal has been removed by recovering the fine coal in the fine coal recovery plant can be fed to the precipitator.

In the coal fired boiler plant according to the present invention, the heat recovery equipment can be disposed on the upstream side of the precipitator.

As a result, it is possible to reduce the temperature of the combustion exhaust gas that is fed to the precipitator. As a result, the dust collection performance of the precipitator is improved, and the dust collection efficiency is increased.

Of course, a configuration in which the heat recovery equipment is disposed on the downstream side of the precipitator is also possible.

The present invention also includes a method of drying coal that is supplied to a boiler in the coal fired boiler plant as described above, comprising: heating a heating medium recovered in heat recovery equipment that is provided on the downstream side of an air heater in the direction of flow of combustion exhaust gas using the heat energy of the combustion exhaust gas that is discharged from the boiler as a result of combustion of the coal in the boiler; and drying the coal supplied to the boiler using the heat energy of the heating medium.

Advantageous Effects of Invention

According to the present invention, it is possible to properly dry coal and increase the efficiency of a boiler while suppressing any reduction in efficiency of the boiler and suppressing the generation of hydrocarbon gas components.

DESCRIPTION OF EMBODIMENTS

The following is an explanation of a coal fired boiler plant and a coal drying method for a coal fired boiler plant according to the present invention, with reference to the drawings.

First Embodiment

A first embodiment of the present invention will be described below using FIG. 1.

Figure 1:
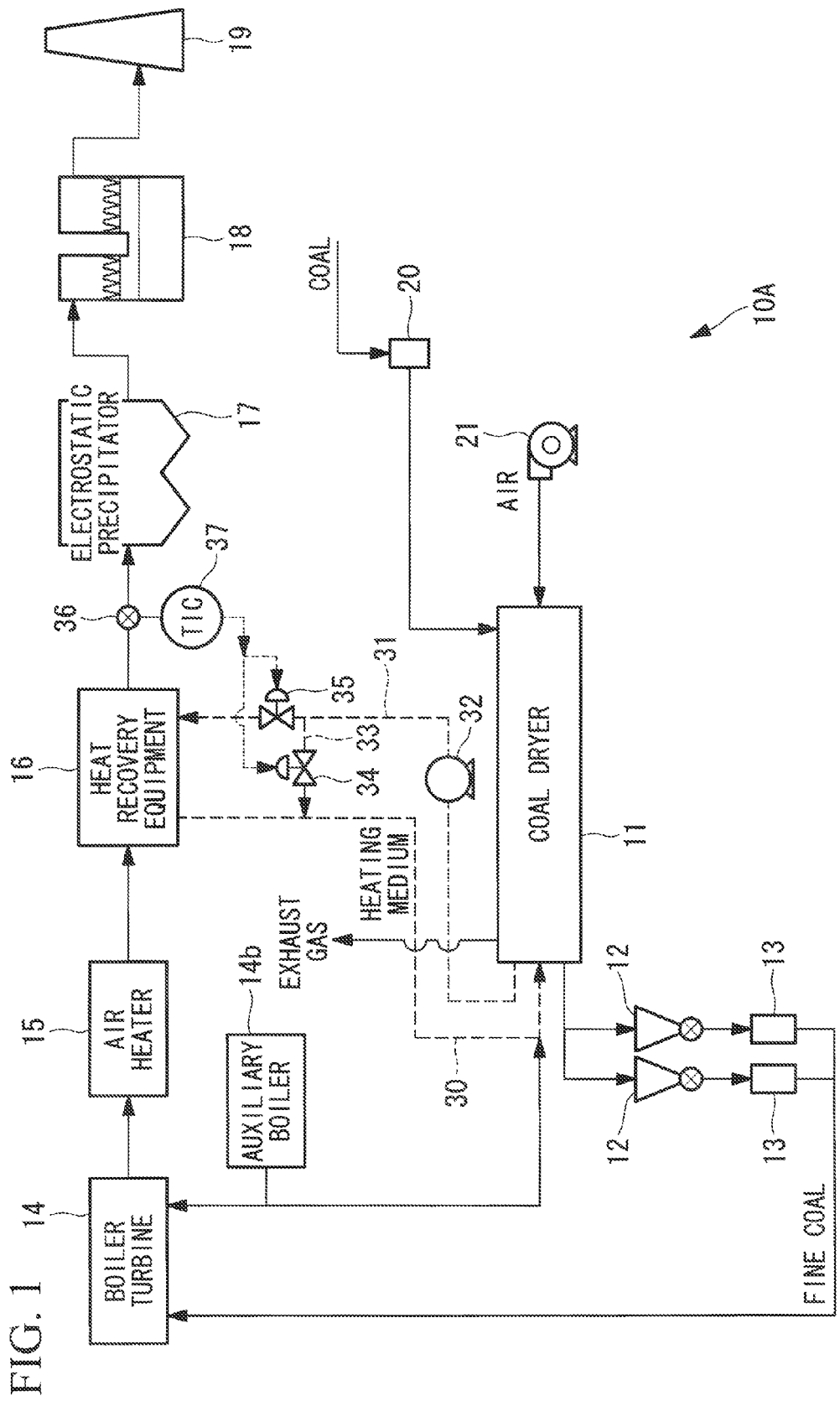
FIG. 1 illustrates a configuration of a coal fired boiler plant according to a first embodiment of the present invention.

As illustrated in FIG. 1, a coal fired boiler plant 10A mainly includes a coal dryer 11, a coal bunker 12, a coal mill 13, a boiler turbine (boiler) 14, an air heater 15, heat recovery equipment 16, an electrostatic precipitator 17, a desulfurization plant 18, and a flue 19.

Coal that is pulverized in a coal crusher 20 is fed to the coal dryer 11, and is transported by air as a carrier gas blown in by an air blower 21, and the coal dryer 11 dries the coal by a configuration that is explained in detail later.

The coal bunker 12 temporarily stores the coal that is dried in the coal dryer 11.

The coal mill 13 pulverizes the coal that is supplied from the coal bunker 12, and converts it into coal powder with a predetermined particle size.

The coal powder that is pulverized in the coal mill 13 is fed to the boiler turbine 14, and in the boiler thereof, it is mixed with air for combustion supplied from the outside and burned, water is heated with the heat energy, and steam is generated. The turbine of the boiler turbine 14 is driven by the steam that is generated, and this driving power is used for the required work such as causing a generator or the like to rotate. Here, there is no limitation on the use of the driving power generated in the boiler turbine 14.

Heat is exchanged in the air heater 15 between the combustion exhaust gas discharged from the boiler unit of the boiler turbine 14 and air for combustion supplied to the boiler unit. As a result, the air for combustion is heated by the sensible heat of the combustion exhaust gas, and supplied to the boiler of the boiler turbine 14.

Here, heat is exchanged between the air for combustion and the combustion exhaust gas discharged from the air heater 15 so that the combustion exhaust gas is at a temperature of from 130 to 170° C.

The heat recovery equipment 16 recovers heat energy from the combustion exhaust gas by heat exchange between the combustion exhaust gas that has passed through the air heater 15 and a cooling medium such as water or the like, so that the temperature of the combustion exhaust gas is further reduced. A fin-tube type of heat recovery equipment in which heat is exchanged between a cooling medium that flows within a tube and the combustion exhaust gas that flows around fins provided integrally on the tubes, can be used as the heat recovery equipment 16.

The electrostatic precipitator 17 collects dust in the combustion exhaust gas that has passed through the heat recovery equipment 16 using electrostatic forces.

The desulfurization plant 18 mainly carries out a removal process (desulfurization process) to remove $SO_2$ from the combustion exhaust gas that has passed through the electrostatic precipitator 17. There is no particular limitation on the method of the desulfurization process in this embodiment.

The flue 19 releases the combustion exhaust gas that has been desulfurized into the atmosphere.

The coal fired boiler plant 10A has the following configuration in order that the coal dryer 11 can perform the drying process on the coal with higher efficiency.

In this embodiment, lines 30, 31 are provided between the heat recovery equipment 16 and the coal dryer 11, and coal within the coal dryer 11 is heated by the heat recovered in the heat recovery equipment 16, so drying of the coal is promoted.

Specifically, the cooling medium such as water or the like that is heated by heat exchange with the combustion exhaust gas in the heat recovery equipment 16 is fed by the line 30 as a heating medium to the coal dryer 11. In the coal dryer 11, the coal within the coal dryer 11 is directly heated by the heat energy of the heating medium such as water or the like fed from the heat recovery equipment 16.

If the coal dryer 11 is a rotary kiln type, the heating medium is fed from the line 30 to tubes provided within the rotary kiln, so that by heating the coal that passes around the tubes, drying of the coal is promoted.

The heating medium that has lost its heat energy within the coal dryer 11 is circulated to the heat recovery equipment 16 via the line 31 using a pump 32.

Here, a bypass line 33 may be provided between the line 30 and the line 31, and control valves 34, 35 may be provided on the bypass line 33 and the line 31. Opening and closing and the degree of opening of the control valves 34, 35 are adjusted automatically by a temperature controller 37 based on the measurement results of a sensor 36 provided on the combustion exhaust gas outlet side of the heat recovery equipment 16. The temperature controller 37 adjusts the opening and closing and the degree of opening of the control valves 34, 35 so that the temperature of the combustion exhaust gas on the outlet side of the heat recovery equipment 16 is within a predetermined temperature range, for example, from 85 to 95° C.

By controlling the temperature of the combustion exhaust gas from the heat recovery equipment 16 as described above, reduction in the fluidity of the ash collected in the electrostatic precipitator on the downstream side of the heat recovery equipment 16 is prevented.

According to the configuration as described above, coal within the coal dryer 11 is heated by heat recovered from the combustion exhaust gas in the heat recovery equipment 16, so that drying of the coal is promoted. As a result, it is not necessary to bleed steam from the boiler turbine 14, so it is possible to increase the efficiency (output) of the boiler turbine 14. Also, the calorific value of the coal is increased by drying the coal, so from this point, also it is possible to increase efficiency of the boiler turbine 14. As a result, less coal is needed to obtain the same output, so it is possible to suppress the quantity of coal used in the coal fired boiler plant 10A, and achieve lower costs.

In addition, by drying the coal, the combustion conditions within the boiler turbine 14 approach the ideal combustion conditions, so it is possible to reduce the quantity of combustion exhaust gas. As a result, it is possible to reduce the quantity of supplementary makeup water used for desulfurization in the desulfurization plant 18, and in this respect, also it is possible to achieve lower costs.

Also, by drying the coal, the effect of reduction of the quantity of mercury and NOx contained in the combustion exhaust gas is expected.

Also, in the coal fired boiler plant 10A, the heat recovery equipment 16 is provided on the upstream side of the electrostatic precipitator 17, and as a result, the temperature of the combustion exhaust gas fed to the electrostatic precipitator 17 is reduced. As a result, the dust collection performance of the electrostatic precipitator 17 is improved, and the dust collection efficiency is increased. Also, as a result, it is possible to minimize the quantity of $SO_3$ in the combustion exhaust gas.

Incidentally, in the coal fired boiler plant 10A that is configured as described above, the temperature of the exhaust gas from the boiler turbine 14 is low during startup, so there is a possibility that the action and effect as described above cannot be obtained sufficiently.

Therefore, during startup, heating of the coal as described above may be carried out after the load on the boiler turbine 14 has increased, and the temperature of the combustion exhaust gas has sufficiently increased.

Also, normally, an auxiliary boiler 14b for startup is provided with the boiler turbine 14, so during startup, steam from the auxiliary boiler 14b can be supplied as a heat source to the coal dryer 11, so it is possible to promote drying of the coal.

Application Examples of the First Embodiment

The following are descriptions of several configurations that can be added to the configuration of the first embodiment as described above as application examples.

Application Example 1

Figure 2:
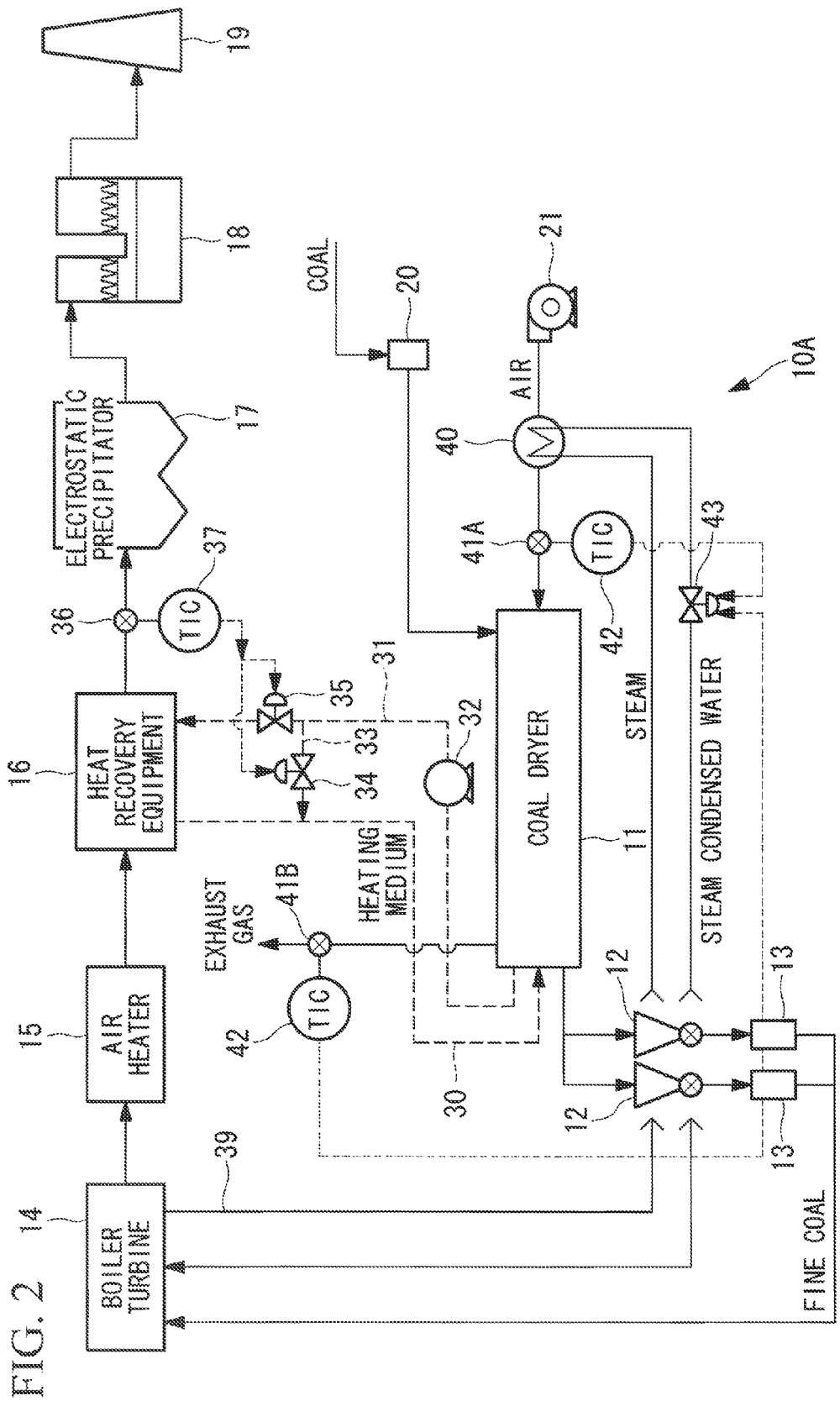
FIG. 2 illustrates an application example of the coal fired boiler plant according to the first embodiment of the present invention.

In the coal fired boiler plant 10A illustrated in FIG. 2, in addition to the configuration described for the first embodiment above, steam extracted from the boiler turbine 14 may be fed to an air heater 40 provided between the air blower 21 and the coal dryer 11 via a line 39. Then, in the air heater 40, heat is exchanged between the extracted steam and the air (carrier air) fed from the air blower 21 to the coal dryer 11, and the air is heated.

Here, extracting of the steam from the boiler turbine 14 can be carried out at a suitable location, such as the low-pressure side, medium pressure side, and the like. Also, preferably, condensed water that has passed through the air heater 40 is returned to the low-pressure side of the boiler turbine 14.

As a result, the temperature of the air fed to the coal dryer 11 is increased, and drying of the coal within the coal dryer 11 is further promoted.

Heat exchange in the air heater 40 as described above can be adjusted in accordance with the temperature of the carrier air in the coal dryer 11. In this case, the temperature of the air may be measured by a sensor 41A or 41B provided on the outlet side of the air blower 21, or on the exhaust gas side of the coal dryer 11, and the quantity of steam extracted from the boiler turbine 14 may be adjusted by a temperature controller 42 and a valve 43 based on the measurement results.

Application Example 2

Figure 3:
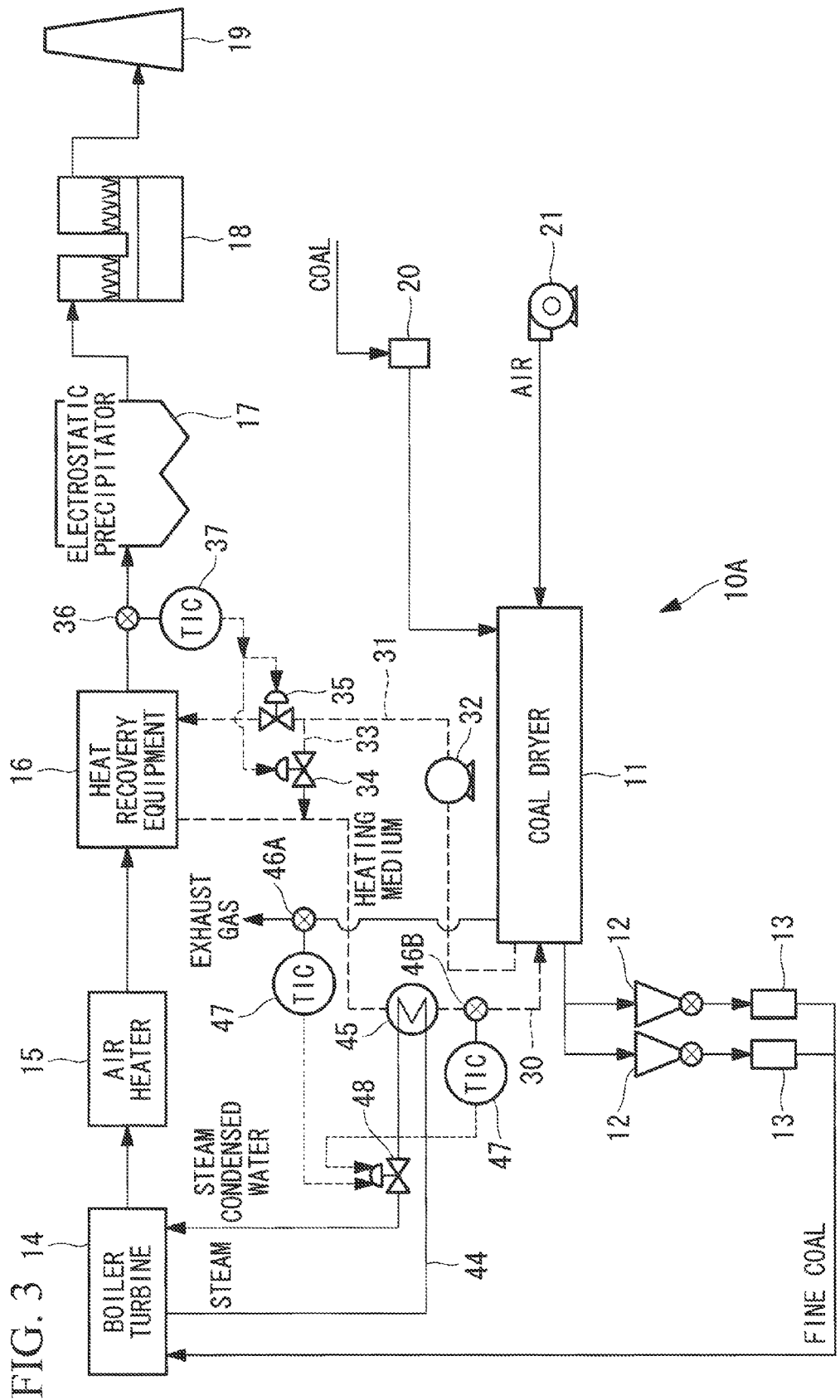
FIG. 3 illustrates an application example of the coal fired boiler plant according to the first embodiment of the present invention.

Also, in the coal fired boiler plant 10A illustrated in FIG. 3, in addition to the configuration described for the first embodiment above, steam may be extracted from the boiler turbine 14, and fed to a heating medium heater 45 provided on the line 30 that supplies the heating medium from the heat recovery equipment 16 to the coal dryer 11 via a line 44. Also, the heating medium is further heated in this heating medium heater 45.

As a result, the temperature of the heating medium fed to the coal dryer 11 is further increased, and drying of the coal within the coal dryer 11 is further promoted.

Heat exchange in the heating medium heater 45 as described above can be controlled by adjusting the quantity of steam extracted from the boiler turbine 14 using a temperature controller 47 and a valve 48 based on the measurement results of a temperature sensor 46A provided on the exhaust gas side of the coal dryer 11, or a heating medium temperature sensor 46B provided on the line 30.

Application Example 3

Figure 4:
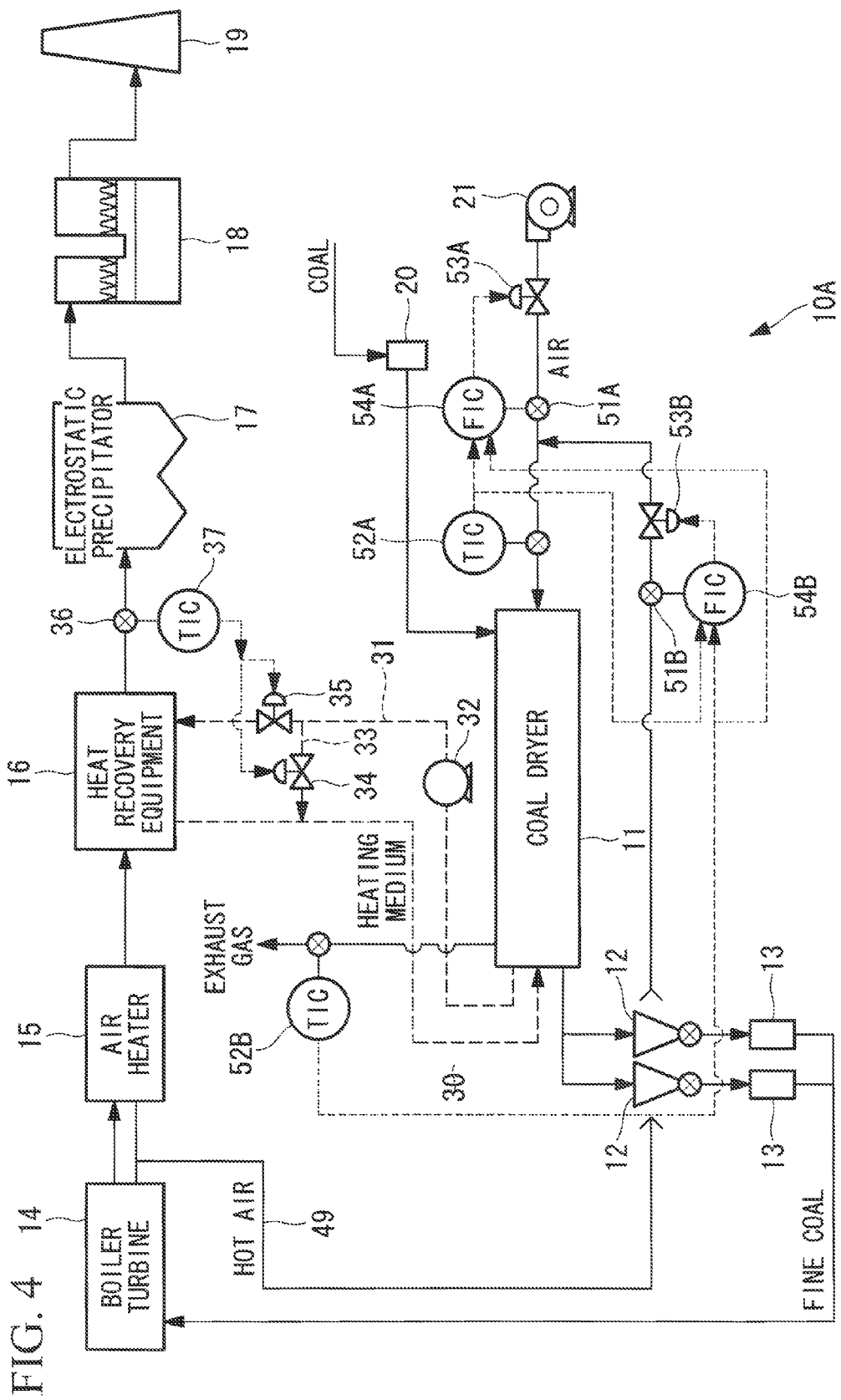
FIG. 4 illustrates an application example of the coal fired boiler plant according to the first embodiment of the present invention.

Also, in the coal fired boiler plant 10A illustrated in FIG. 4, air for drying that has been heated using the combustion exhaust gas from the boiler turbine 14 as a heat source and generated in the air heater 15 can be fed to the outlet side of the air blower 21 via a line 49.

As a result, the temperature of the air fed to the coal dryer 11 is increased, and drying of the coal within the coal dryer 11 is further promoted.

The supply of the air for drying as described above can be controlled by adjusting the flow rate (mixing ratio) of the air for drying supplied from the line 49 and the carrier air supplied from the air blower 21. This can be achieved using valves 53A, 53B and flow rate controllers 54A, 54B provided on the outlet side of the air blower 21 and on the line 49, so that their temperatures are within a predetermined range using a temperature controller 52A or 52B that are based on the air temperature measured by a sensor 51A or 51B provided, in this case, on the outlet side of the air blower 21 or on the exhaust air side of the coal dryer 11.

Second Embodiment

Next, a second embodiment of the present invention will be described below. In the following explanation of the second embodiment, the configuration that is common with the first embodiment as described above is given the same reference numerals in the drawings and its explanation is omitted, and the explanation is focused on the differences from the first embodiment as described above.

Figure 5:
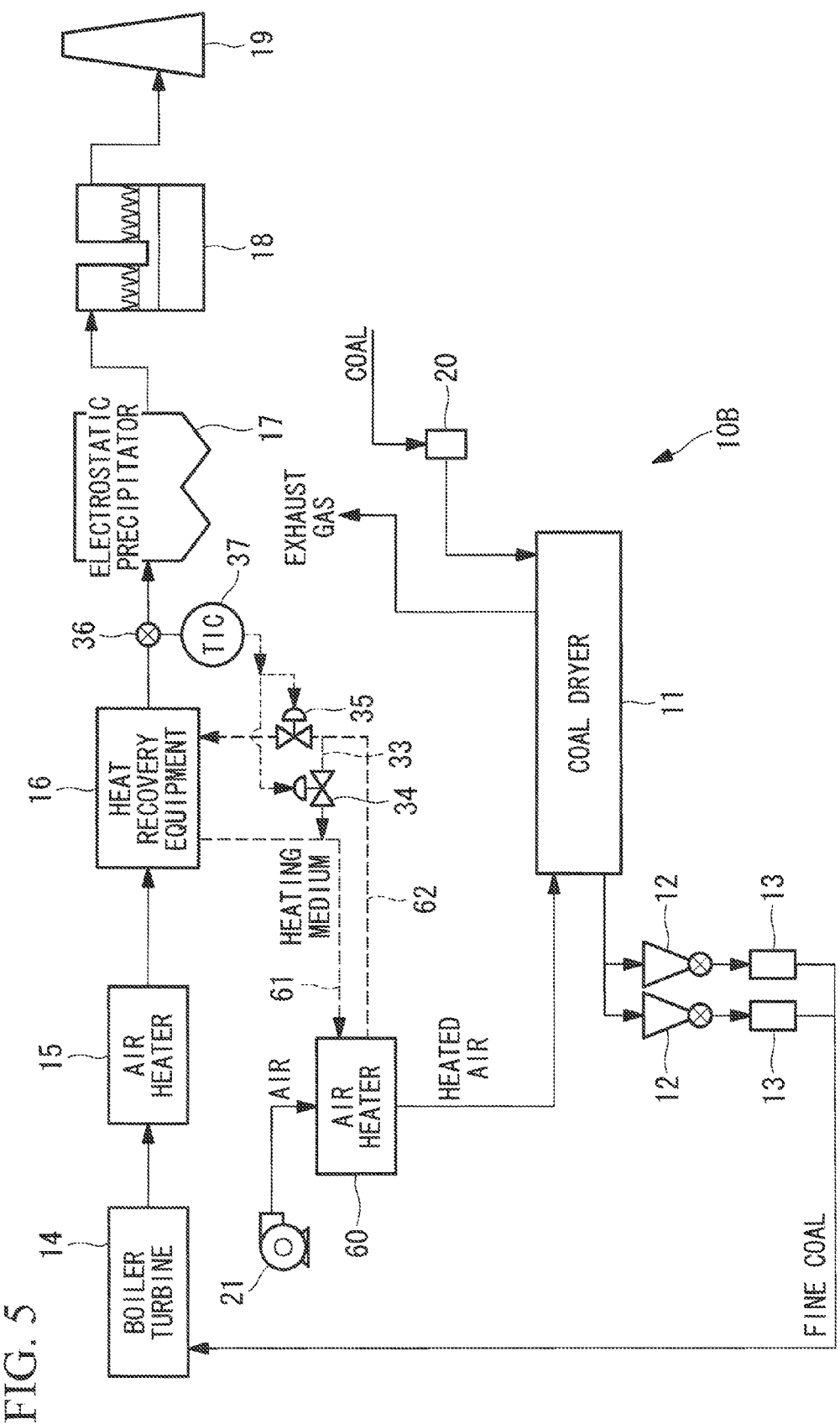
FIG. 5 illustrates a configuration of a coal fired boiler plant according to a second embodiment of the present invention.

As illustrated in FIG. 5, a coal fired boiler plant 10B according to this embodiment mainly includes the coal dryer 11, the coal bunker 12, the coal mill 13, the boiler turbine 14, the air heater 15, heat recovery equipment 16, the electrostatic precipitator 17, the desulfurization plant 18, and the flue 19.

In this embodiment, coal that has been pulverized in the coal crusher 20 is fed to the coal dryer 11, and air fed from the air blower 21 is heated in a second air heater 60 to become heated air, and this heated air transports the coal as carrier gas, and the coal dryer 11 dries the coal using the heat of the heated air.

The second air heater 60 heats the air using a cooling medium (heating medium) such as water or the like as a heat source that is heated by heat exchange with the combustion exhaust gas in the heat recovery equipment 16. In other words, the cooling medium such as water or the like that is heated by heat exchange with the combustion exhaust gas in the heat recovery equipment 16 is fed by a line 61 as the heating medium to the second air heater 60. In the second air heater 60, the air is heated to become heated air through heat exchange between the air fed from the air blower 21 and this heating medium.

The heating medium that has lost its heat energy in the second air heater 60 is circulated to the heat recovery equipment 16 via a line 62.

Here, as with the configuration illustrated in FIG. 1, the bypass line 33 may be provided between the line 61 and the line 62, and control valves 34, 35 may be provided on the bypass line 33 and the line 62. Opening and closing and the degree of opening of the control valves 34, 35 are adjusted automatically by a temperature controller 37 based on the measurement results of a sensor 36 provided on the combustion exhaust gas outlet side of the heat recovery equipment 16. Using the temperature controller 37, the opening and closing and the degree of opening of the control valves 34, 35 are adjusted and the quantity of heating medium circulating between the heat recovery equipment 16 and the second air heater 60 is controlled so that the temperature of the combustion exhaust gas on the outlet side of the heat recovery equipment 16 is within a predetermined temperature range, for example, from 85 to 90° C.

According to the configuration as described above, the air that is fed to the coal dryer 11 is heated by the heat recovered from the combustion exhaust gas in the heat recovery equipment 16. Within the coal dryer 11, drying of coal is promoted by the contact between this air and the coal. As a result, it is not necessary to extract steam from the boiler turbine 14, so it is possible to increase the efficiency (output) of the boiler turbine 14. Also, the calorific value of the coal is increased by drying the coal, so from this point, also it is possible to increase the efficiency of the boiler turbine 14. As a result, less coal is needed to obtain the same output, so it is possible to reduce the quantity of coal used in the coal fired boiler plant 10B, and achieve lower costs.

In addition, by drying the coal, the combustion conditions within the boiler turbine 14 approach the ideal combustion conditions, so it is possible to reduce the quantity of combustion exhaust gas. As a result, it is possible to reduce the quantity of supplementary makeup water used for desulfurization in the desulfurization plant 18, and in this respect, also it is possible to achieve lower costs.

Also, by drying the coal, the effect of reduction of mercury and NOx contained in the combustion exhaust gas is expected.

Application Examples of the Second Embodiment

The following are descriptions of several configurations that can be added to the configuration of the second embodiment as described above as application examples.

Application Example 1

Figure 6:
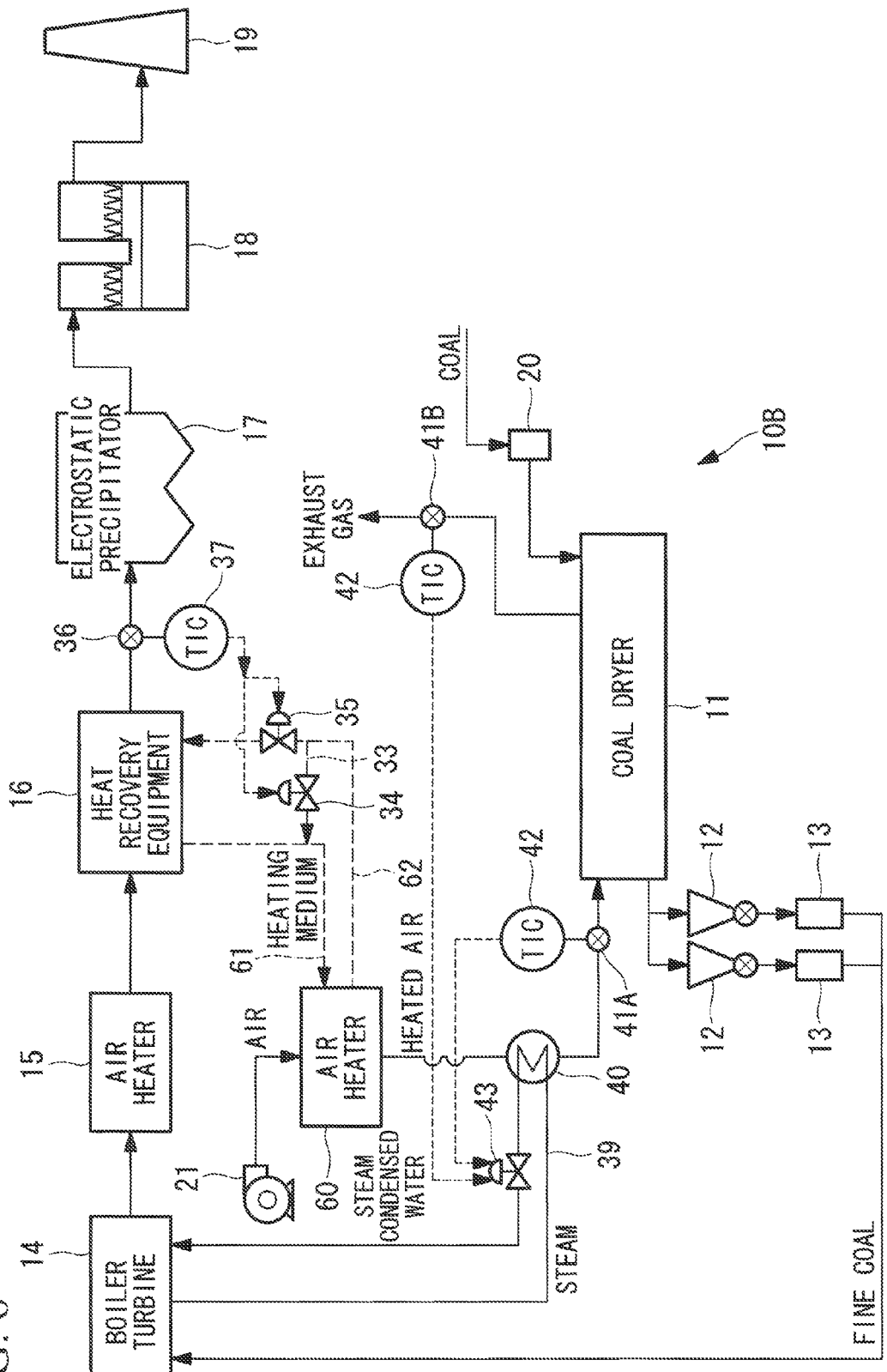
FIG. 6 illustrates an application example of the coal fired boiler plant according to the second embodiment of the present invention.

In the coal fired boiler plant 10B illustrated in FIG. 6, in addition to the configuration described for the second embodiment above, steam extracted from the boiler turbine 14 may be fed to an air heater 40 provided between the second air heater 60 and the coal dryer 11 via the line 39. Then, in the air heater 40, heat is exchanged between the extracted steam and the heated air (carrier air) fed from the second air heater 60 to the coal dryer 11, and the heated air is further heated.

As a result, the temperature of the air fed to the coal dryer 11 is further increased, and drying of the coal in the coal dryer 11 is further promoted.

Heat exchange in the air heater 40 as described above can be adjusted in accordance with the temperature of the carrier air in the coal dryer 11. In this case, the temperature of the air may be measured by the sensor 41A or 41B provided on the outlet side of the second air heater 60 or on the exhaust gas side of the coal dryer 11, and the quantity of steam extracted from the boiler turbine 14 may be adjusted by the temperature controller 42 and the valve 43 based on the measurement results.

Application Example 2

Figure 7:
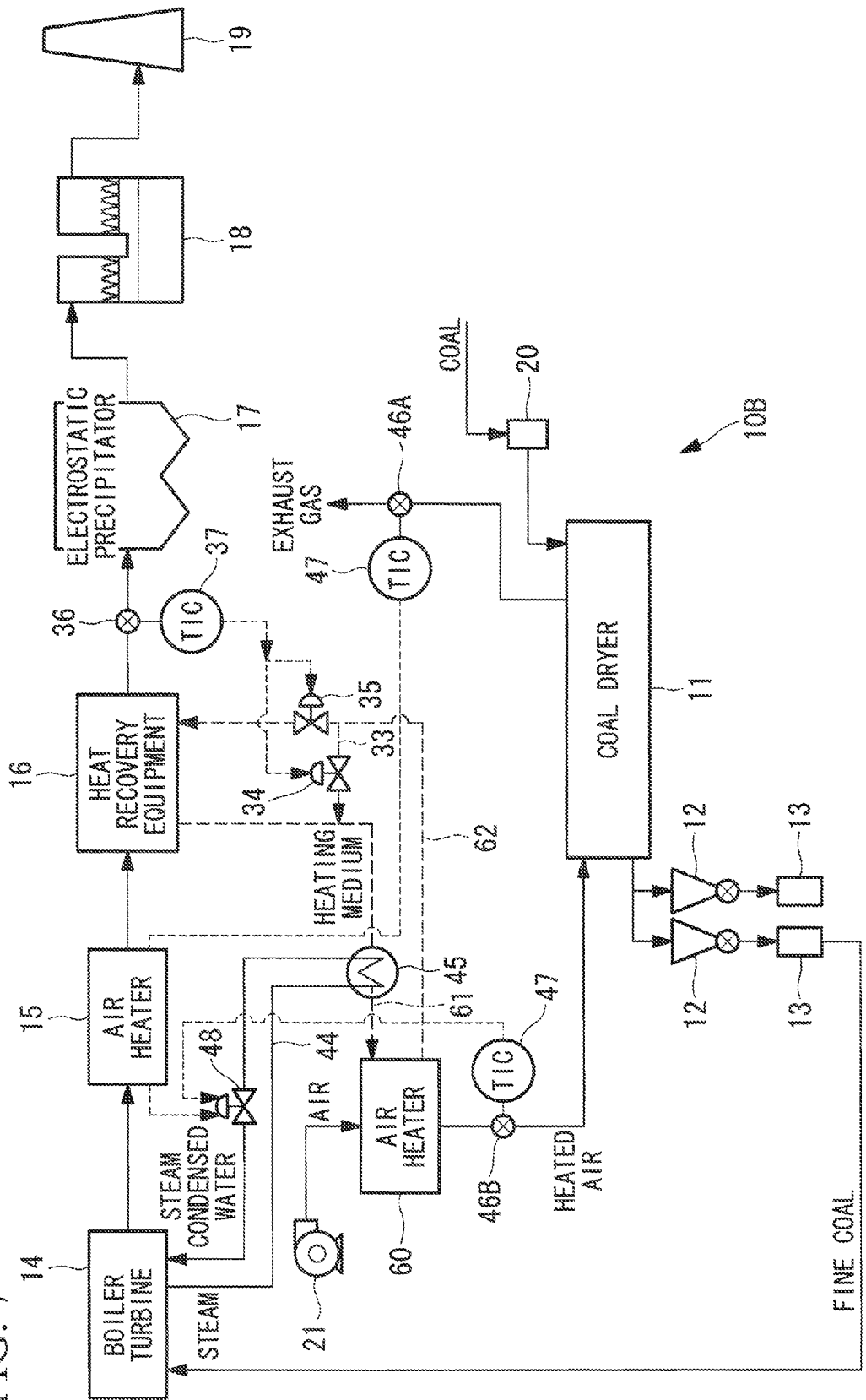
FIG. 7 illustrates an application example of the coal fired boiler plant according to the second embodiment of the present invention.

Also, in the coal fired boiler plant 10B illustrated in FIG. 7, in addition to the configuration described for the second embodiment above, steam may be extracted from the boiler turbine 14, and fed to the heating medium heater 45 provided on the line 30 that supplies the heating medium from the heat recovery equipment 16 to the coal dryer 11 via the line 44. Also, the heating medium is further heated in this heating medium heater 45.

As a result, the temperature of the heating medium fed to the second air heater 60 is further increased, the temperature of the heated air is further increased, and drying of the coal within the coal dryer 11 is further promoted.

Heat exchange in the heating medium heater 45 as described above can be controlled by adjusting the quantity of steam extracted from the boiler turbine 14 using the temperature controller 47 and the valve 48 based on the measurement results of the temperature sensor 46A provided on the exhaust gas side of the coal dryer 11, or a heating medium temperature sensor 46B provided on the inlet side of the coal dryer 11.

Application Example 3

Figure 8:
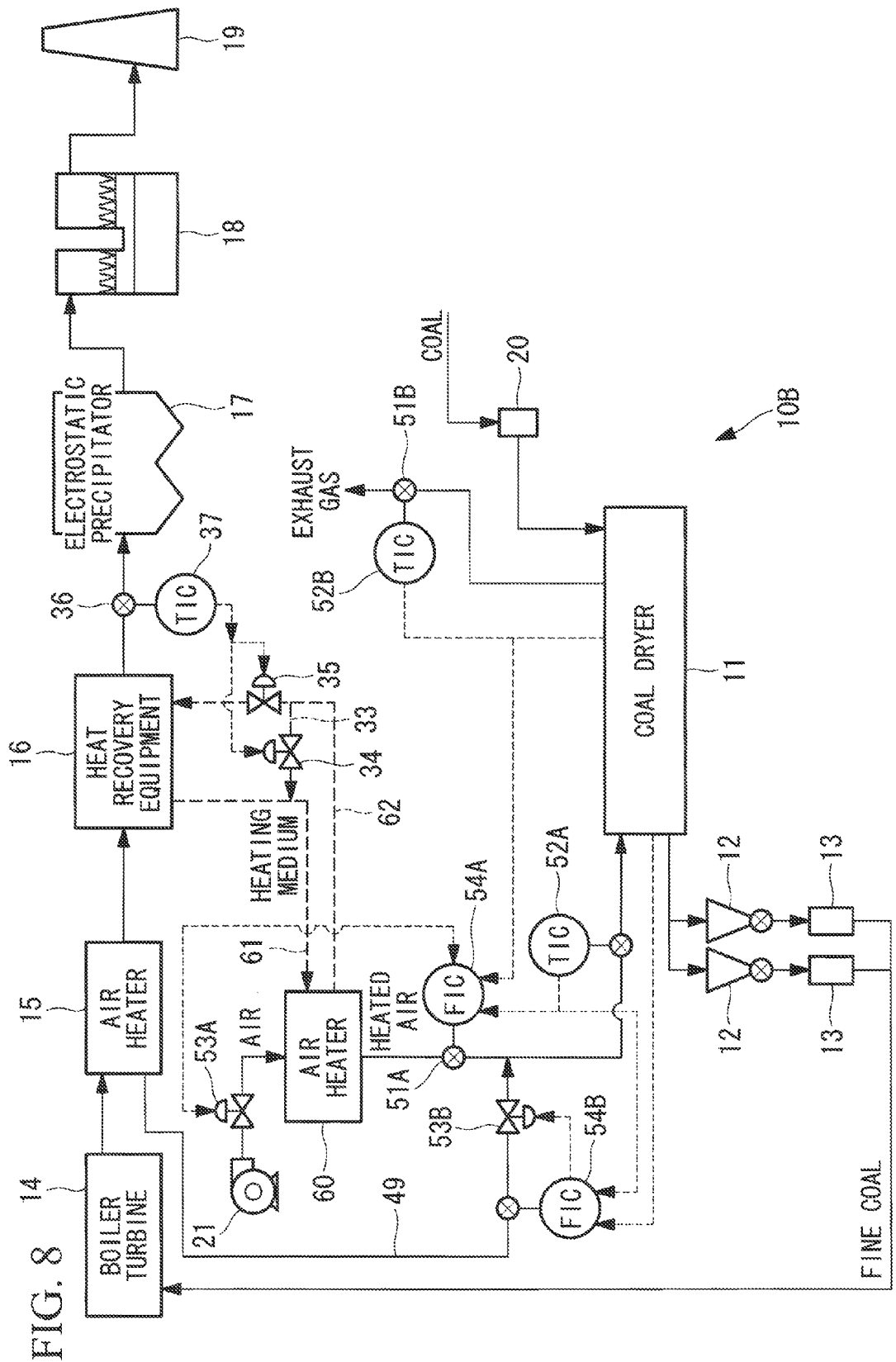
FIG. 8 illustrates an application example of the coal fired boiler plant according to the second embodiment of the present invention.

Also, in the coal fired boiler plant 10B illustrated in FIG. 8, air for drying that has been heated using the combustion exhaust gas from the boiler turbine 14 as a heat source and generated in the air heater 15 may be fed to the outlet side of the second air heater 60 via the line 49.

As a result, the temperature of the air fed to the coal dryer 11 is increased, and drying of the coal in the coal dryer 11 is further promoted.

In this case, the supply of this air for drying can be controlled by adjusting the flow rate (mixing ratio) of the air for drying supplied from the line 49 and the heated air supplied from the air blower 21. This can be achieved using the valves 53A, 53B and the flow rate controllers 54A, 54B provided on the outlet side of the air blower 21 and on the line 49, so that their temperatures are within a predetermined range using the temperature controller 52A or 52B based on the air temperature measured by the sensor 51A or 51B provided on the outlet side of the second air heater 60 or on the exhaust gas side of the coal dryer 11.

Third Embodiment

Next, a third embodiment of the present invention will be described below. In the following explanation of the third embodiment, the configuration that is common with the first embodiment and second embodiment as described above is given the same reference numerals in the drawings and its explanation is omitted, and the explanation is focused on the differences from the first embodiment and second embodiment as described above.

The configuration of the third embodiment described below can be added to any of the configurations illustrated in FIGS. 1 through 8. In the following, an example is described in which the configuration according to this embodiment is added to the configuration illustrated in FIG. 5.

Figure 9:
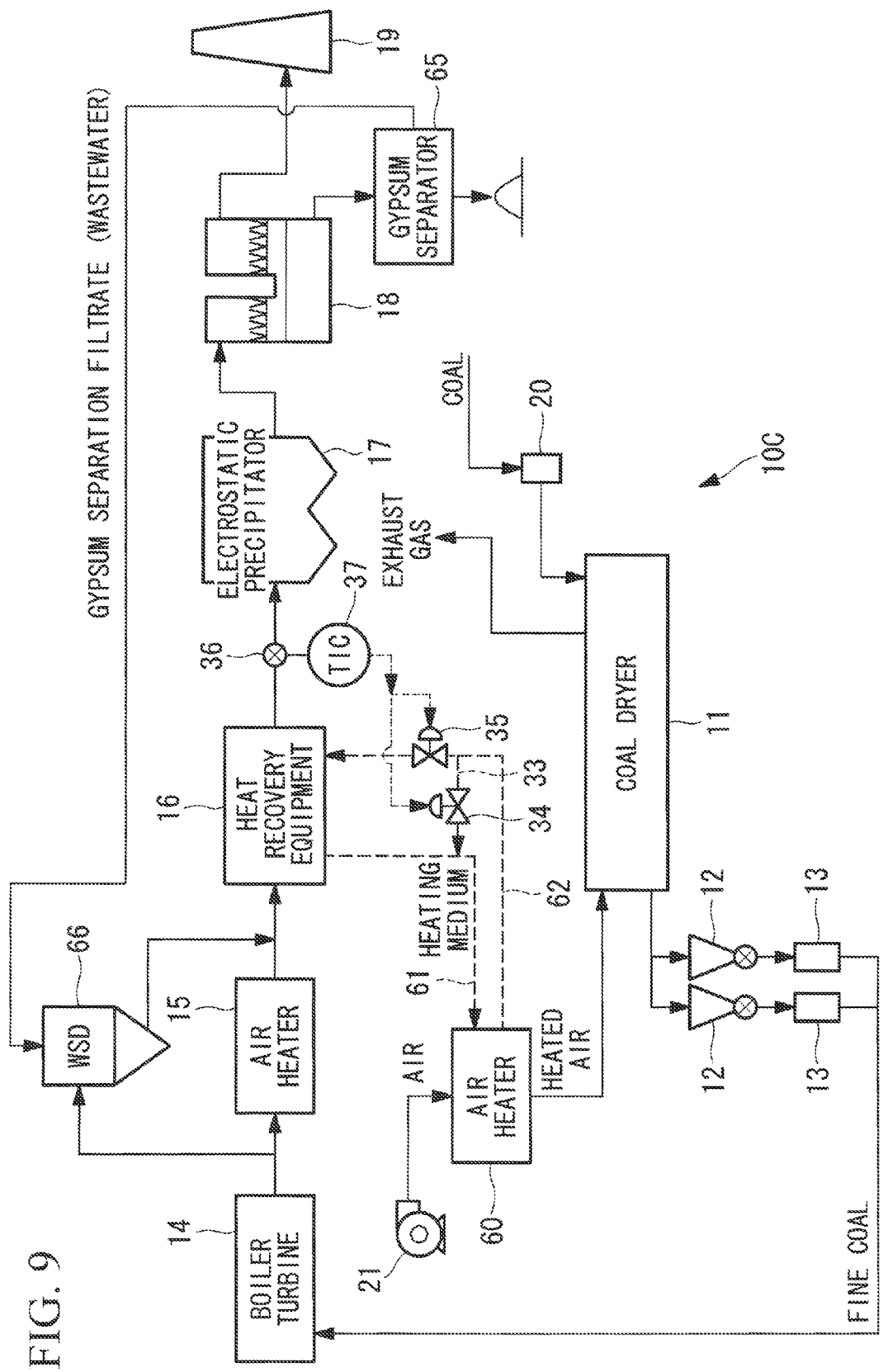
FIG. 9 illustrates a configuration of a coal fired boiler plant according to a third embodiment of the present invention.

As illustrated in FIG. 9, a coal fired boiler plant 10C according to this embodiment includes a gypsum separator 65 and a spray dryer 66, in addition to the configuration of the coal fired boiler plant 10B illustrated in FIG. 5.

The gypsum separator 65 filters the wastewater from the desulfurization plant 18, and separates into the gypsum component and the filtrate. The filtrate (wastewater) obtained from the gypsum separator 65 is fed to the spray dryer 66.

The filtrate fed from the gypsum separator 65 and the high temperature combustion exhaust gas from the boiler turbine 14 are fed to the spray dryer 66. The filtrate and the combustion exhaust gas are fed to the spray dryer 66, and sprayed into the combustion exhaust gas on the outlet side of the air heater 15.

As a result, the water component of the filtrate contacts the combustion exhaust gas and is evaporated. As a result, it is possible to eliminate the wastewater from the desulfurization plant 18. Also, it is possible to reduce the temperature of the combustion exhaust gas on the upstream side of the heat recovery equipment 16 by evaporating the water component of the filtrate.

Fourth Embodiment

Next, a fourth embodiment of the present invention will be described below. In the following explanation of the fourth embodiment, the configuration that is common with the first through third embodiments as described above is given the same reference numerals in the drawings and its explanation is omitted, and the explanation is focused on the differences from the first through third embodiments as described above.

The configuration of the fourth embodiment described below can be added to any of the configurations illustrated in FIGS. 1 through 9. In the following, an example is described in which the configuration according to this embodiment is added to the configuration illustrated in FIG. 5.

Figure 10:
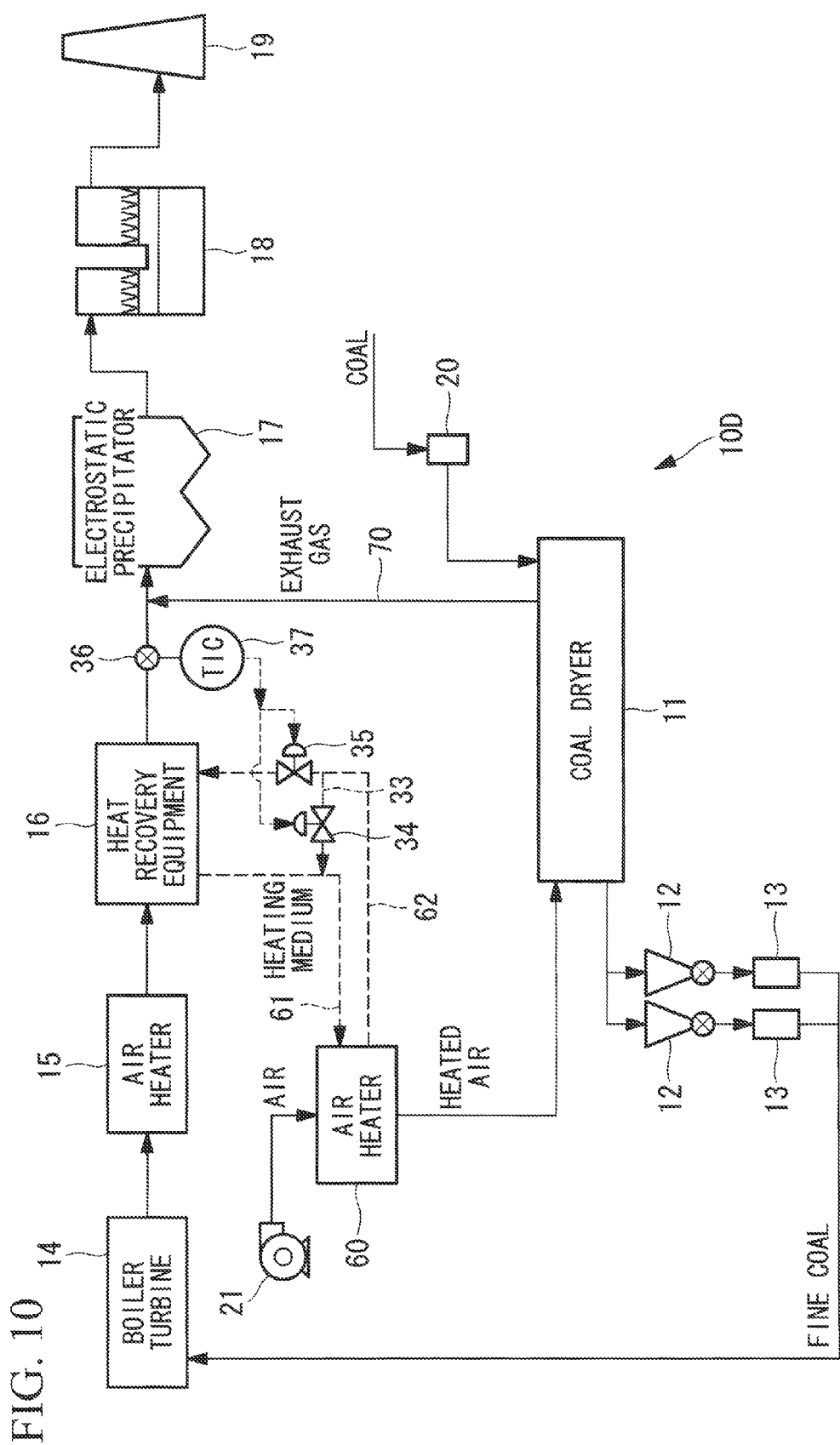
FIG. 10 illustrates a configuration of a coal fired boiler plant according to a fourth embodiment of the present invention.

As illustrated in FIG. 10, a coal fired boiler plant 10D according to this embodiment includes a line 70 that feeds exhaust gas from the coal dryer 11 to the inlet side of the electrostatic precipitator 17, in addition to the configuration of the coal fired boiler plant 10B illustrated in FIG. 5.

By feeding the exhaust gas from the coal dryer 11 to the electrostatic precipitator 17 via the line 70, in the electrostatic precipitator 17, it is possible to recover the fine coal included in the exhaust gas from the coal dryer 11.

As a result, it is possible to further clean the exhaust gas discharged from the coal fired boiler plant 10D, and prevent pollution of the atmospheric environment. In addition, it is not necessary to separately provide equipment to recover the fine coal included in the exhaust gas from the coal dryer 11, so it is possible to obtain the effects described above at lower costs.

When fine coal is burned in the boiler turbine 14, mercury is segregated. Therefore, because the fine coal included in the exhaust gas from the coal dryer 11 is recovered in the electrostatic precipitator 17, mercury is not released.

Fifth Embodiment

Next, a fifth embodiment of the present invention will be described below. In the following explanation of the fifth embodiment, the configuration that is common with the first through fourth embodiments as described above is given the same reference numerals in the drawings and its explanation is omitted, and the explanation is focused on the differences from the first through fourth embodiments as described above.

The configuration of the fifth embodiment described below can be added to any of the configurations illustrated in FIGS. 1 through 10. In the following, an example is described in which the configuration according to this embodiment is added to the configuration illustrated in FIG. 5.

Figure 11:
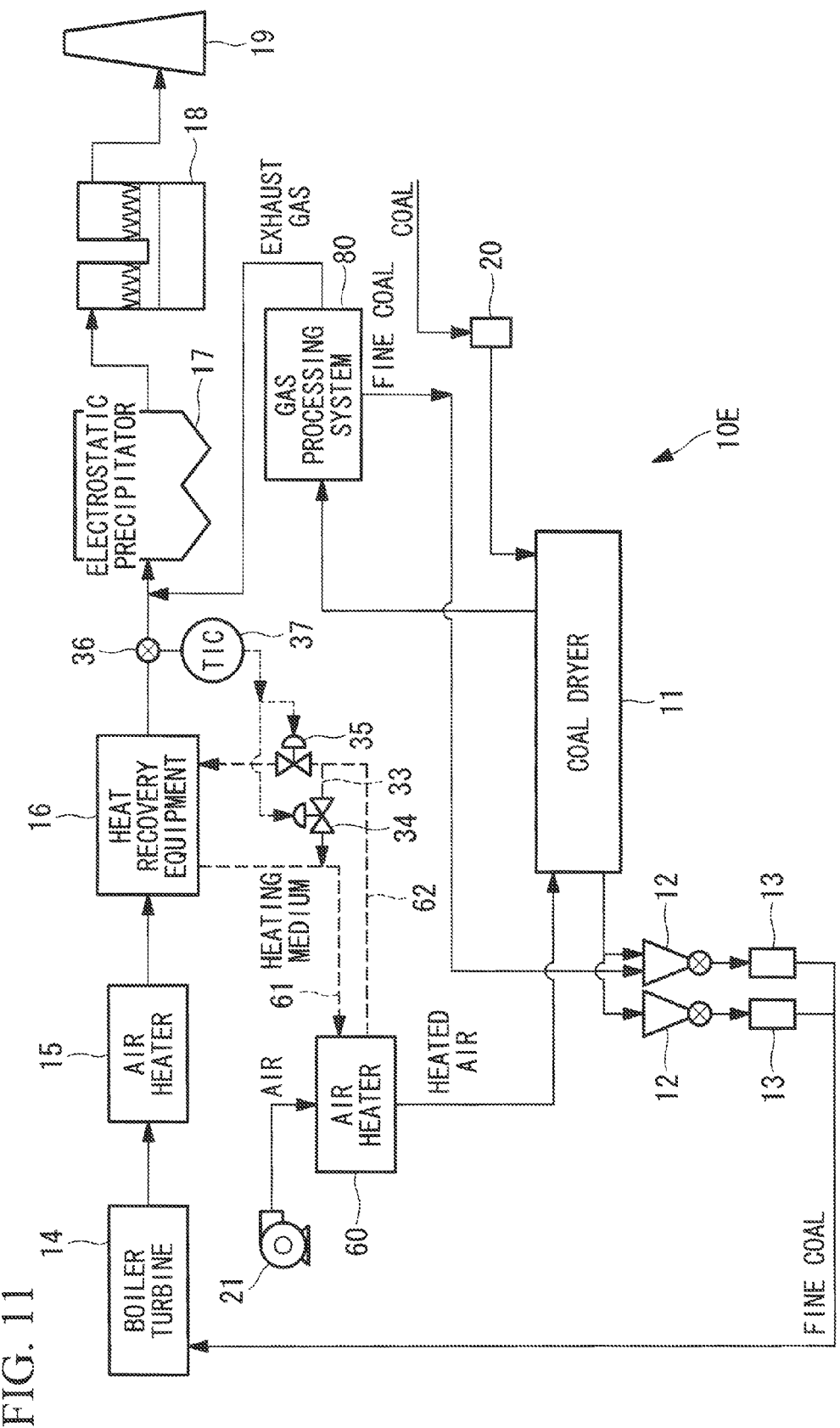
FIG. 11 illustrates a configuration of a coal fired boiler plant according to a fifth embodiment of the present invention.
Figure 12:
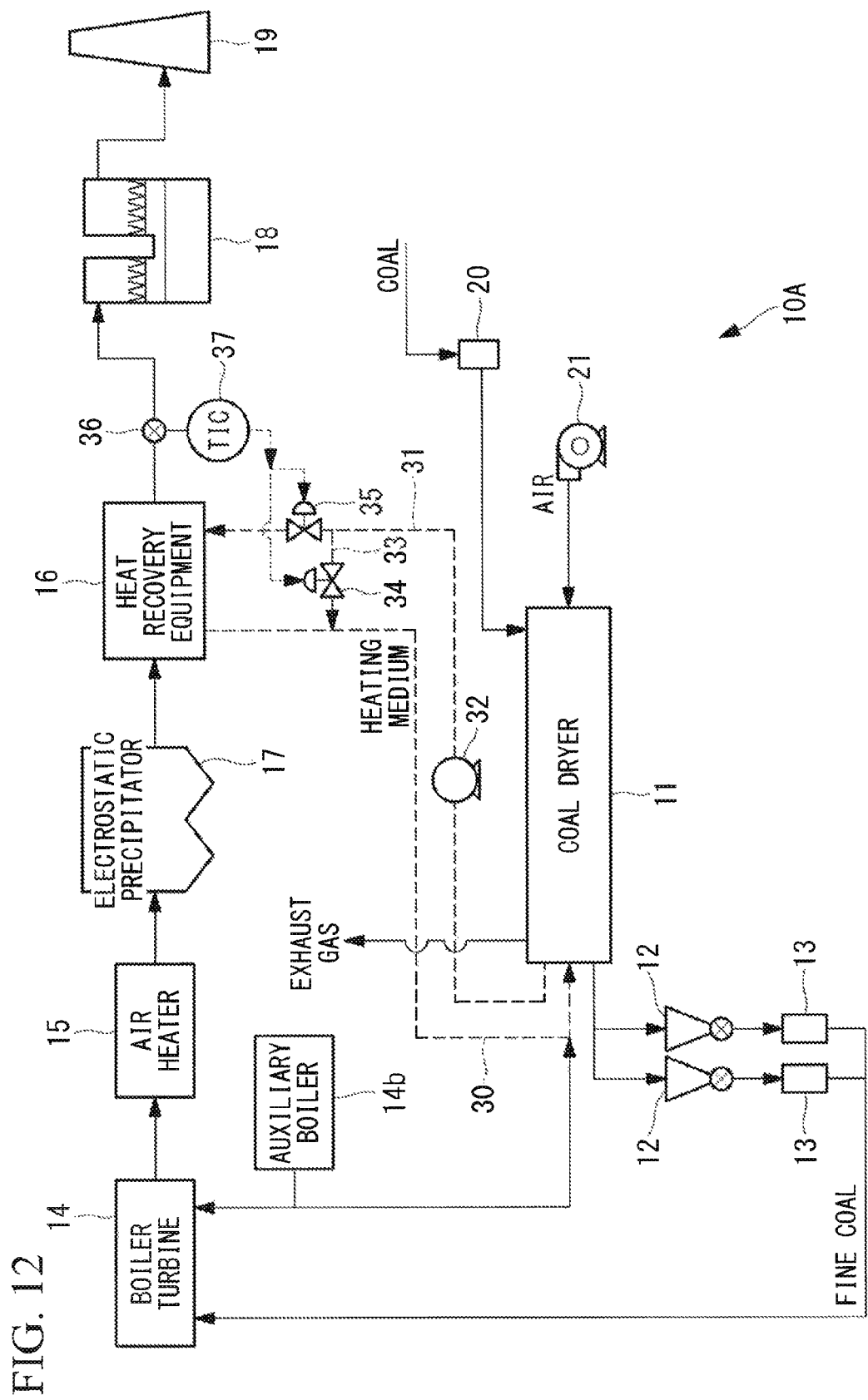
FIG. 12 illustrates a modified configuration of the coal fired boiler plant according to the first embodiment of the present invention.

As illustrated in FIG. 11, a coal fired boiler plant 10E according to this embodiment includes a configuration in which exhaust gas from the coal dryer 11 is fed to a gas processing system (fine coal recovery plant) 80, in addition to the configuration of the coal fired boiler plant 10B illustrated in FIG. 5.

The gas processing system 80 separates the exhaust gas from the coal dryer 11 into a gaseous component and fine coal that was contained in the exhaust gas.

The gas that has passed through the gas processing system 80 is fed to the inlet side of the electrostatic precipitator 17.

Also, the fine coal that is collected in the gas processing system 80 is fed to the coal bunker 12.

By feeding the exhaust gas from the coal dryer 11 to the electrostatic precipitator 17 via the gas processing system 80 as described above, it is possible to further clean the exhaust gas discharged from the coal fired boiler plant 10D, and prevent pollution of the atmospheric environment.

In addition, it is possible to more effectively use the coal by feeding the fine coal collected in the gas processing system 80 to the boiler turbine 14 via the coal bunker 12.

In addition, by feeding the fine coal collected in the gas processing system 80 to the coal bunker 12, it is possible to prevent the coal powder from mixing with the ash collected by the electrostatic precipitator 17.

The configurations described in each of the above embodiments can be changed as appropriate provided they are within the intent of the scope of the present invention.

For example, the configurations described for the first through fifth embodiments above can be combined as appropriate.

Also, in each of the embodiments, the heat recovery equipment 16 is provided on the upstream side of the electrostatic precipitator 17, but the electrostatic precipitator 17 may be provided on the upstream side of the heat recovery equipment 16.

Besides this, the configurations described in the embodiments above can be adopted or discarded as desired, or changed as appropriate into other configurations, provided there is no deviation from the intent of the present invention.

REFERENCE SIGNS LIST 10A-10E coal fired boiler plant
11 Coal dryer
12 Coal bunker
13 Coal mill
14 Boiler turbine (boiler)
14b Auxiliary boiler
15 Air heater
16 Heat recovery equipment
17 Electrostatic precipitator
18 Desulfurization plant
19 Flue
20 Coal crusher
21 Air blower
30, 31 Line
32 Pump
33 Bypass line
34, 35 Control valve
36 Sensor
37 Temperature controller
39 Line
40 Air heater
41A, 41B Sensor
42 Temperature controller
43 Valve
44 Line
45 Heating medium heater
46A, 46B Temperature sensor
47 Temperature controller
48 Valve
49 Line
51A, 51B Sensor
52A, 52B Temperature controller
53A, 53B Valve
54A, 54B Flow rate controller
60 Air heater
61 Line
62 Line
65 Gypsum separator
66 Spray dryer
70 Line
80 Gas processing system (fine coal recovery plant)

The invention claimed is:
1. A coal fired boiler plant, comprising:
a coal dryer that dries coal;
a boiler in which the coal that was dried in the coal dryer is mixed with air for combustion and burned;
an air heater that heats the air for combustion supplied to the boiler using combustion exhaust gas discharged from the boiler;
a precipitator that collects dust included in the combustion exhaust gas;
a desulfurization plant that performs a desulfurization process on the combustion exhaust gas;
heat recovery equipment that is provided on the downstream side of the air heater in the direction of flow of the combustion exhaust gas, and that heats a heating medium with the combustion exhaust gas,
a sensor that is provided on the downstream side of the heat recovery equipment in the direction of flow of the combustion exhaust gas, and that measures a temperature of the combustion exhaust gas on the outlet side of the heat recovery equipment,
a second air heater that heats carrier air supplied from the outside into the coal dryer using the heating medium that was heated in the heat recovery equipment, and
a third air heater that extracts a portion of steam which is generated by heating water with a heat energy obtained by burning the coal in the boiler and that further heats the carrier air using the portion of steam,
wherein the heat recovery equipment is connected to a first line through which the heating medium is fed into and a second line through which the heating medium is sent out,
wherein a bypass line is provided between the first line and the second line,
wherein control valves are provided on the bypass line and the first line, respectively,
wherein the sensor and the control valves are connected via a temperature controller, wherein the coal dryer dries the coal using the heat energy of the heating medium that was heated in the heat recovery equipment, wherein the carrier air heated by the second air heater and the third air heater dries the coal within the coal dryer, wherein the temperature controller adjusts opening and closing and a degree of opening of the control valves, controls a quantity of the heating medium, and controls the temperature of the combustion exhaust gas from the heat recovery equipment, on the basis of the measurement results of the sensor; and wherein the heating medium is water.

2. The coal fired boiler plant according to claim 1, wherein the coal dryer dries the coal within the coal dryer by passing the heating medium that has been heated in the heat recovery equipment through a tubes provided within the coal dryer.

3. The coal fired boiler plant according to claim 1, further comprising a heating medium heater that further heats the heating medium that has been heated in the heat recovery equipment using steam that has been extracted by extracting a portion of the steam generated by burning the coal in the boiler.

4. The coal fired boiler plant according to claim 1, wherein the air heater heats air for drying supplied to the coal dryer using combustion exhaust gas discharged from the boiler, and the coal dryer dries the coal within the coal dryer using the air for drying that is fed into the coal dryer.

5. The coal fired boiler plant according to claim 4, wherein a portion of the air for combustion heated in the air heater is branched off and mixed with the carrier air that is supplied from the outside into the coal dryer, and supplied into the coal dryer.

6. The coal fired boiler plant according to claim 1, wherein the desulfurization plant performs a desulfurization process by bringing the combustion exhaust gas into contact with process water, and the coal fired boiler plant further comprises a spray dryer that evaporates wastewater obtained by separating a gypsum component from the process water after the desulfurization process, by bringing the wastewater into contact with the combustion exhaust gas on the upstream side of the desulfurization plant.

7. The coal fired boiler plant according to claim 1, wherein the coal dryer feeds the exhaust gas from the coal dryer to the precipitator.

8. The coal fired boiler plant according to claim 1, further comprising a fine coal recovery plant that recovers fine coal smaller than a predetermined particle size from the coal that is included in the exhaust gas from the coal dryer, and the fine coal recovery plant supplies the recovered fine coal to the boiler together with the coal that has been dried in the coal dryer.

9. The coal fired boiler plant according to claim 8, wherein the exhaust gas from which the fine coal has been removed by recovering the fine coal in the fine coal recovery plant is fed to the precipitator.

10. The coal fired boiler plant according to claim 1, wherein the heat recovery equipment is disposed on the upstream side of the precipitator.

11. The coal fired boiler plant according to claim 1, wherein the heat recovery equipment is disposed on the downstream side of the precipitator.

12. A method of drying coal that is supplied to a boiler in the coal fired boiler plant according to claim 1, comprising:

heating a heating medium recovered in heat recovery equipment that is provided on the downstream side of an air heater in the direction of flow of combustion exhaust gas using the heat energy of combustion exhaust gas that is discharged from a boiler as a result of combustion of the coal in the boiler; and drying the coal supplied to the boiler using the heat energy of the heating medium.

* * * * *